(12) United States Patent
Ferro Montíu

(10) Patent No.: US 8,172,328 B2
(45) Date of Patent: May 8, 2012

(54) SUSPENDED VERTICAL HEAD RESTRAINT FOR VEHICLE SEATS

(75) Inventor: Javier Ferro Montíu, Elcano (ES)

(73) Assignee: Siesta Systems, S.A., Elcano, (Navarra) (ES)

( * ) Notice: Subject to any disclaimer, the term of this patent is extended or adjusted under 35 U.S.C. 154(b) by 288 days.

(21) Appl. No.: 12/601,358

(22) PCT Filed: Feb. 23, 2009

(86) PCT No.: PCT/ES2009/000097
§ 371 (c)(1),
(2), (4) Date: Nov. 23, 2009

(87) PCT Pub. No.: WO2009/118432
PCT Pub. Date: Oct. 1, 2009

(65) Prior Publication Data
US 2010/0171353 A1    Jul. 8, 2010

(30) Foreign Application Priority Data

Mar. 24, 2008  (WO) ................. PCT/E52008/000160

(51) Int. Cl.
*A47C 1/10*         (2006.01)

(52) U.S. Cl. .................... 297/397; 297/392; 297/394

(58) Field of Classification Search ................ 297/397, 297/392, 393, 464, 487
See application file for complete search history.

(56) References Cited

U.S. PATENT DOCUMENTS

| | | | |
|---|---|---|---|
| 1,837,406 A |   | 12/1931 | Campbell |
| 3,645,556 A | * | 2/1972 | Kobori ........................... 280/749 |
| 4,339,151 A | * | 7/1982 | Riggs ............................ 297/464 |

(Continued)

FOREIGN PATENT DOCUMENTS
DE           9001789          4/1990
(Continued)

OTHER PUBLICATIONS

International Search Report issued Jun. 26, 2009 in International (PCT) Application No. PCT/ES2009/000097.

*Primary Examiner* — David Dunn
*Assistant Examiner* — Erika Garrett
(74) *Attorney, Agent, or Firm* — Wenderoth, Lind & Ponack, L.L.P.

(57) ABSTRACT

The invention relates to a removable suspended device which serves as both a head rest and a head restraint for the passenger of a vehicle. The invention is essentially characterized in that the device is suspended in space such that it can move without any direct contact being established between the supporting area and the seat, thereby maintaining the vertical position of both the head and the neck. The preferred embodiment of the invention includes a rigid suspension element (6) which is generally secured to the highest part (7) of a seat and from which the main body (MB) of the device is suspended. The lower occipital region of the head is supported by the lower area of the main body of the device (2). The head is further restrained by means of a front area (4) restricting forward movement and two vertical side areas restricting side movements. The aim of the invention is to improve a passenger's quality of rest and sleep, to prevent neck discomfort and injury and to provide increased safety in the event of an accident or a sudden vehicle maneuver.

11 Claims, 3 Drawing Sheets

U.S. PATENT DOCUMENTS

| | | | | |
|---|---|---|---|---|
| 4,707,031 A | * | 11/1987 | Meistrell | 297/393 |
| 4,869,240 A | * | 9/1989 | Boren | 602/32 |
| 5,010,898 A | * | 4/1991 | de Kanawati et al. | 128/845 |
| 5,108,150 A | | 4/1992 | Stas et al. | |
| 5,314,404 A | * | 5/1994 | Boughner et al. | 602/17 |
| 5,511,854 A | * | 4/1996 | Cordia | 297/393 |
| 6,811,222 B1 | * | 11/2004 | Sumner | 297/392 |
| 7,393,057 B2 | * | 7/2008 | Fraser | 297/392 |

FOREIGN PATENT DOCUMENTS

| | | |
|---|---|---|
| GB | 1497847 | 1/1978 |
| WO | 2007/031153 | 3/2007 |

* cited by examiner

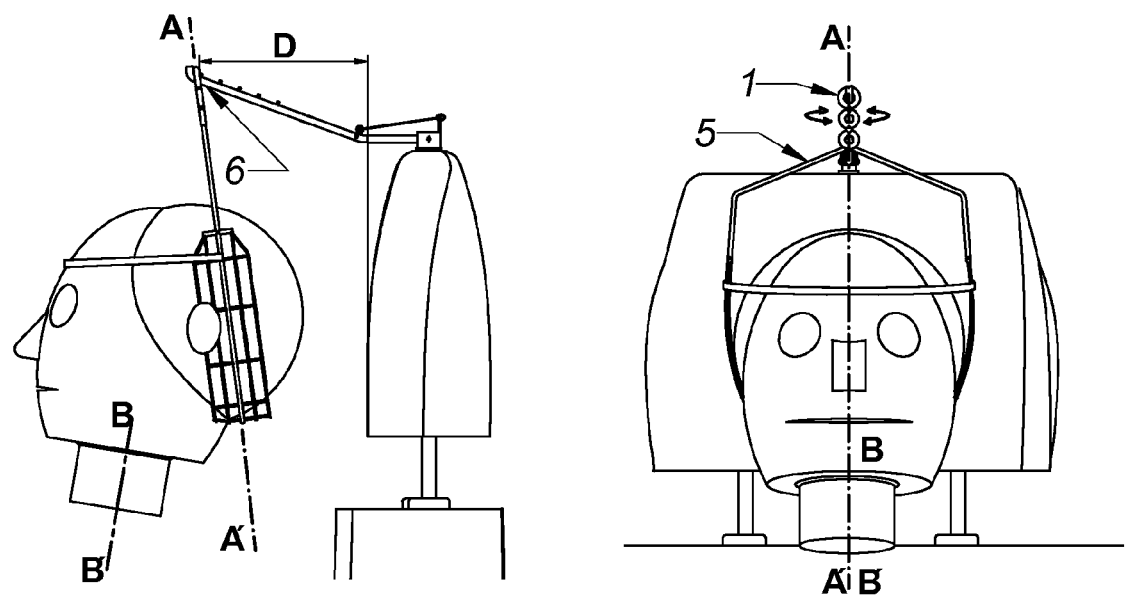
FIG. 3A                    FIG. 3B
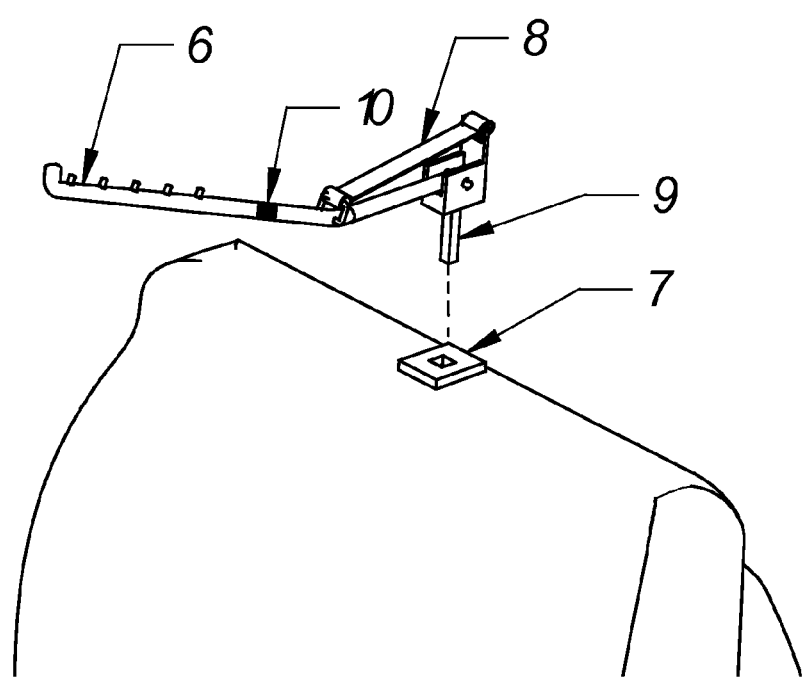
FIG. 4

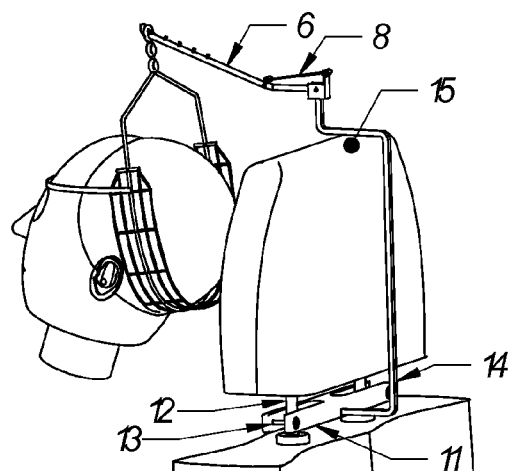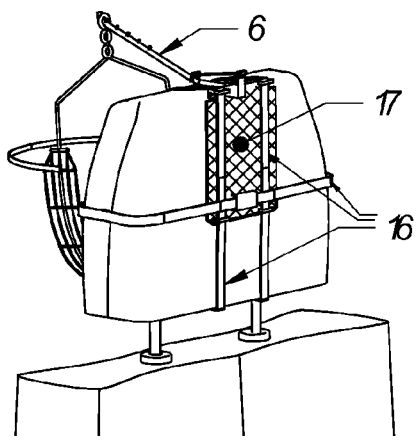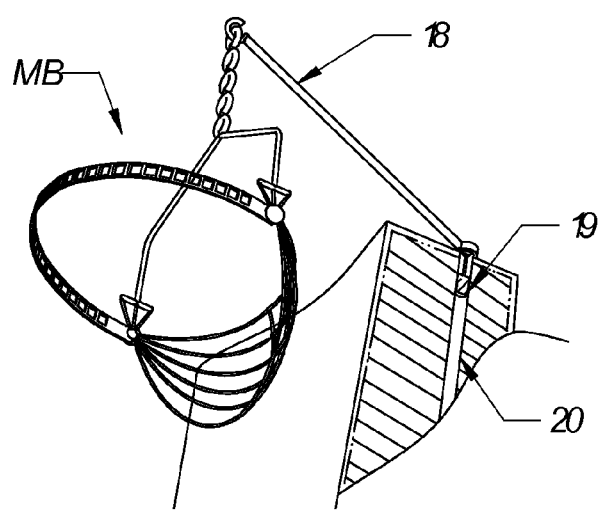

ial position of the present invention. In other
SUSPENDED VERTICAL HEAD RESTRAINT FOR VEHICLE SEATS

TECHNICAL FIELD OF THE INVENTION

In general, the present invention relates to a suspended vertical head restraint for vehicle seats. More particularly, the invention relates to a mobile restraint device for the head which successfully improves the resting conditions, it prevents postural disturbances of the neck and increases the safety of a passenger. The combination of suspension and mobile characteristics achieved by the attachment of the main body of the invention to a suspension element located above the head and secured in the upper part of the back-rest of a seat constitutes, as far as our knowledge of the prior art is concerned, a novel concept in the field of devices for vehicle seats, since a non-rigid and vertical is suspension of the head is achieved at the same time as restricting its movements in likely directions of displacement. The resulting effect has been referred to as "Dynamic and floating vertical restraint of the head and neck".

BACKGROUND OF THE INVENTION

When one makes a medium or long distance journey in any means of transport, the passengers frequently become sleepy as a result of inactivity. When sleep starts to occur, a relaxation takes place of the muscles of the neck and torso which leads to the head nodding or to its lateral rolling, along with poor positioning of the neck. All this gives rise to continual interruptions to sleep, which prevents any refreshing rest from being achieved. Moreover, the postures which the neck adopts are dangerous for the state of health of the cervical zone and can be much more serious in case of accident or a brusque maneuver of the vehicle, especially if this occurs during the said periods of muscular relaxation.

Some known devices for trying to reduce both the nodding of the head and the lateral rolling of it with respect to the back-rest of the seat and thereby improving rest during the journey include pillows and similar devices. The most popular of these is a pillow, inflatable or otherwise, with the shape of a horseshoe which rests on the shoulders and is positioned around the passenger's neck in order to support the head in a more or less vertical position. Nevertheless, it is known that said pillows do not provide sufficient support for the head which ends up being considerably inclined, with the consequent disturbance that this produces, especially in the neck. There exist other patented devices which aim to facilitate rest for the passenger by means of rigid elements such as those described in documents: U.S. Pat. No. 6,033,023, U.S. Pat. No. 4,881,777, U.S. Pat. No. 5,806,933, GB2415616, FR2883528, U.S. Pat. No. 7,204,557, US2003/0038521, FR2875752, EP1106427, JP200325149, US2001040401, U.S. Pat. No. 5,806,933, JP20066213253, U.S. Pat. No. 4,097,086, U.S. Pat. No. 5,868,471, ES2221767, WO2005/000629, GB2246292 and others which are based on the use of belts or bands which are applied to different parts of the head, like those described in the documents: FR2534125, CN1059690, US2004124685, DE9001789U1, GB1497847A and WO2007031153A2. None of the above documents shares the main characteristics of the present invention, in other words, that it concerns a mobile and suspended device from an independent suspension element located above the head, and instead they refer to non-suspended and rigid is elements or those which are attached directly to the fixed structure of the vehicle. Moreover, in the case of the aforementioned inventions which carry out a restraint of the head by means of belts or cords, the functioning axis of the restraint is horizontal and anterior-posterior, rather than being vertical, which substantially changes the way in which it works, the properties and, indeed, the resulting effect on the restraint of the head.

The documents technically closest to the present invention, due to sharing its suspended character in passenger vehicles, are: U.S. Pat. No. 1,837,406, U.S. Pat. No. 1,855,408, US70555A, US83227A and FR2720988A1, which are analyzed below.

The main differences between the document U.S. Pat. No. 1,837,406 and the present invention are the following:

1/ it comprises a complicated device for securing in the lower part of the seat which contrasts with the simple securing system in the upper part of the seat of the present invention.

2/ it does not comprise any frontal restraint element in its design and therefore there does not exist any mechanism which secures the head with regard to its forward movement, notably decreasing the safety of the passenger in the event of accident. On the contrary, the device of the present invention considers safety to be one of the priority objectives, and it therefore surrounds the head in order to improve its restraint, especially in front-on accidents, side impacts and sudden braking.

3/ it comprises a part of the metallic restraint structure that is located very close to the head and on both sides of the same, which notably affects the safety since the head could knock against the described metallic structure. Nevertheless, in the present invention, the rigid structure is at all times kept separate, above the head, and it has a safety mechanism that increases that distance more when the head becomes separated from its support.

4/ it comprises two attachment zones with the suspension system instead of one, unlike the preferred forms of embodiment of the present invention.

The suspended devices described in documents U.S. Pat. No. 1,855,408, US70,555A and US83,227A have the following as their main differences compared to the present invention:

1/ they comprise a securing applicable solely to the roof of the vehicle or to a horizontal surface located above the passenger, and is not possible to is adapt it to the back-rest of the seat.

2/ they comprise an arrangement of the head and neck that is in general fairly horizontal compared to the characteristic vertical position of the present invention. In other words, the passenger has to be in a position that is more laying down than seated, thereby requiring a large space to be available around him or her so that such a posture can be adopted.

3/ they do not comprise any frontal restraint element in order to avoid the forward displacement of the head in the event of accident or brusque maneuver of the vehicle.

4/ they have a securing point that is far away in the roof, therefore the restraint response of the head of the passenger in terms of safety with regard to any brusque maneuver of the vehicle becomes excessively delayed, and is virtually null.

The invention described in document FR2720988A1 comprises as its main differences with present invention:

1/ it has the objective of being used by drivers of racing cars rather than by passengers of a transport vehicle and in no case does it aim to improve the capacity for sleep and rest.

2/ it requires a helmet which is secured via its upper part to the suspension bar, in this way, and owing to the rigidity of the helmet and the excessive proximity between its securing point and the suspension bar, the response to displacement is too brusque and immediate, unlike the present invention where it is smooth and progressive. Sudden restraints in the movement of the helmet can generate a brusque jerk on the neck and produce serious injuries in the union between the neck and the head.

3/ it does not incorporate any safety mechanisms.

4/ the suspension plate is fixed to the chassis of the vehicle rather than to the seat, as occurs in the present invention.

Finally, there exist other inventions which are not applicable to transportation vehicles but rather to domestic appliances which serve to facilitate the posture of people with physical impediments, or to systems for carrying out traction in patients with vertebral pathologies, like those described in documents U.S. Pat. No. 5,010,898A and U.S. Pat. No. 4,987,886A. A fundamental difference between the two documents and the present invention is that they do not describe any kind of safety mechanism nor its use in passenger vehicles. Moreover, the invention described in U.S. Pat. No. 5,010,898A reports on a securing made in the rear part of a seat, rather than in the upper zone thereof and a chin rest needs to be provided that will secure the head due to the fact that the vertical belt joining the helmet to said chin rest passes in front of the ears, a situation that does not occur in the present invention where the functioning axis passes behind the ears and is directed towards the lower part of the occipital zone of the head, the place where the head rests on the device, which produces a slight but sufficient tendency of the head to move backwards rather than forwards, and therefore no chin rest is necessary. Moreover, the invention described in document U.S. Pat. No. 4,987,886A is secured to the shoulders of the patient rather than to the back-rest of the seat, it requires the use of a pulley which is in no case necessary in the present invention, and it also comprises rigid elements on both sides of the head, which could be very traumatic if used in a vehicle.

DISCUSSION OF THE INVENTION

The technical problems tackled by the present invention are:

1/ the seat of a passenger in a means of transport is provided with a back-rest, with or without the addition of an individual headrest, which prevents the backward displacement of the head but not its displacement sideways, towards the front, or downwards, and this constitutes a serious problem when the passenger wishes to relax or sleep;

2/ rapid displacements of the head and neck are the main causes of injury in accidents and brusque maneuvers in passenger vehicles, the most frequent of them all being a cervical luxation. In such situations, the trunk of the body is secured by means of the safety belt, while the head suffers displacements in any direction, and it is finally the cervical vertebrae that results more frequently affected;

3/ bad posture of the neck of passengers who fall asleep during a journey is also the cause of injuries, especially if they are predisposed to it due to present a prior cervical pathology.

The three objectives of the present invention are:

1/ To improve the rest and sleep of the passenger during the journey.

2/ To increase the safety of the head and neck in the event of an accident or brusque maneuver of the vehicle.

3/ To avoid injuries and disorders due to poor position of the neck.

In order to achieve these three objectives, the invention generally comprises the following elements:

1/ A suspended main body, non-traumatic, mobile and removable, which surrounds the frontal area of the head and the lower occipital region, and whose function is to restraint the head in all the likely directions of displacement.

2/ A suspension element, fixed or removable, which is secured in the upper part of the vehicle seat and reaches a specific zone in the space. The correct demarcation of this zone is crucial because it determines the functioning axis of the invention.

With all this, the effect achieved has been referred to as "Dynamic and floating vertical restraint of the head and neck". Said restraint is referred to as "dynamic" because it generates a restriction on the movements of the head and neck that is not static but instead keeps step with the actual displacements of the vehicle. The goal is to avoid any pain in specific pressure zones, which with other inventions is indeed produced on account of the rigidity of the contact. The suspended device exerts in a characteristic way a smooth and progressive action when restraining the head. The action mechanism is also referred to as "floating" because the support zone for the suspended main body is not in contact with any element of the vehicle which could restrict its mobility. In this way, it is displaced in any direction of the same horizontal plane until a dynamic restriction starts originated by the articulated attachment of the suspended main body with the rigid suspension element. The fact that in the present invention this attachment is located above the head of the passenger, but not far from it, is a key element so that, when the vehicle makes a turn or during a sudden braking or accidents, the restraint in the movement of the head and neck commences rapidly, but not brusquely.

The use of the present invention prevents the bad posture of the neck in sleeping passengers due to the fact that the head takes on a position that is primarily vertical with just a slight backwards inclination. This is so because the functioning axis of the invention, defined as the line joining the point from which the main body is suspended and the central zone in which the support for the head takes place, is inclined slightly backwards (less than 30°). Moreover, and due to the fact that the axis of the neck is also vertical and is close to the functioning axis of the invention, the passenger can turn his or her neck and head, if so wished, in a way that is integral with the device during its use.

In the event of accident or brusque maneuver of the vehicle, the safety of the passenger improves with the use of the invention due to the fact that some limitation is produced on the displacement of the head and neck in all likely directions. This is on account of the restraint carried out by the suspended main body and its securing to a rigid point located in a forward direction above the head of the seated passenger and at a maximum distance of up to 50 cm from the vertical projection of the front edge of the back-rest of the seat of the vehicle and, when seen front on, is centered with respect to the seat and the head of the passenger. In a characteristic way, the vertical lateral zones of the suspended main body rest on the zone of the temporal bone of the head of the passenger, preferably in the zone immediately behind the ears, thereby creating a restriction on the sideways movements of the head. If the force of lateral displacement of the head is greater than that resistance, due for example to a prolonged turn or a side-on collision of the vehicle, the lateral zone of the parietal bone of the head of the passenger progressively makes contact with the highest part of the vertical lateral zone of the main body, with a total restriction of the sideways movement of the head being completed, owing to the incorporation of that zone. The forward displacement is restricted by means of the frontal restraint, which has a controlled breakage point depending on its composition and resistance, while the downwards and backwards displacements are restricted by means of the support presented by the lower occipital part of the head in the main support zone of the suspended main body. All the restrictions are dynamic and progressive owing to the suspended nature of the invention.

Moreover, and from the point of view of safety, it is important that there are no traumatic elements in the zones of movement of the head. To achieve this, the rigid element of the invention is located above the head and is generally provided with a safety mechanism which displaces it towards the roof of the vehicle as soon as the head ceases to be supported in the suspended main body, and it is therefore unlikely that any trauma could be produced.

To summarize, the main advantages of the invention are to be found among the following:

1/ It concerns a device for passenger seats which acts in a suspended manner and is mobile in all directions until a progressive and dynamic is resistance starts to restraint its displacement, and in which the support zone is not in direct contact with the seat.

2/ The plane in which the device supports the head is constant.

3/ In the event of accident or brusque maneuver of the vehicle, the movements of the head and neck are restricted in the five likely directions of displacement (right, left, forward, back and down) thereby preventing many of the injuries that are currently produced to the cervical and cranial zone.

4/ The dynamic restraint of the movement of the head and neck starts rapidly and increases progressively.

5/ There does not exist any rigid element in the zones of movement of the head and neck, said zones containing just the suspended main mobile body, which is light, flexible and has a soft surface, therefore being a non-traumatic element.

6/ Owing to the fact that the lower occipital restraint zone is close to the union of the head with the neck, both structures are successfully kept in the vertical position at the same time, thereby preventing the postural injuries of the neck which could otherwise occur.

7/ The main support is carried out in zones of the head presenting little sensitivity, thereby preventing the annoying sensation of the pain produced by local pressure in other areas of contact with greater sensitivity, such as the lateral zones of the face.

8/ The lateral visibility of the passenger is not hindered nor is his or her capacity to turn their head in any direction.

BRIEF DESCRIPTION OF THE DRAWINGS

The invention is described below making reference to the attached non-limiting drawings in which:

FIGS. 3A and 3B are side and front views, respectively, in which the zone of the space where the main body of the invention hangs, along with its functioning axis and the axis of rotation of the neck, are indicated;

FIG. 4 is a perspective view in which a securing element located in the upper zone of a headrest can be seen along with an embodiment of the removable suspension element prior to being positioned;

FIGS. 5A and 5B are perspective views of two different embodiments in the case in which neither the securing element nor that for the suspension are previously integrated into the vehicle seat;

FIG. 6 is a perspective view in cross-section of a suspension element integrated into the vehicle seat;

DESCRIPTION OF THE PREFERRED EMBODIMENT FOR VEHICLES IN WHICH THE SECURING ELEMENT IS PREVIOUSLY INTEGRATED INTO THE TOP ZONE OF THE BACK-REST OR HEADREST OF THE SEAT

This type of vehicle has to have a securing element integrated into the design of the seat at the moment it is manufactured, though so far there is no record of any vehicle with this arrangement.

Figure 1:
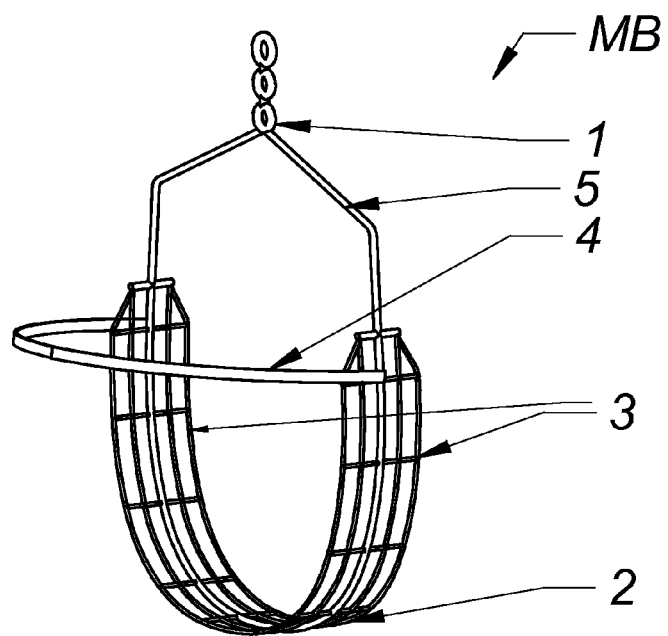
FIG. 1 is a perspective view of an embodiment of the suspended main body.

An embodiment of the suspended main body (MB) is represented in FIG. 1 in a non-limiting manner. This concerns a lightweight element, resistant to traction, flexible and with a soft surface which in general comprises five differentiated zones depending on its use: the upper or suspension zone (1), with a design that permits adjustment so that it can be adapted to passengers of different heights; the lower or support zone (2), which is where the passenger will rest his or her head with its lower occipital part; the vertical lateral zones (3) which serve to restrict the sideways movements of the head and are generally located behind the ears; the front zone or frontal restraint element (4), which surrounds the frontal zone, thereby completing the restraint of the head, having a controlled breakage point depending on its composition, and being removable and adjustable to the contour of the forehead; finally, the intermediate or bridge zone (5), which connects the upper zone with the vertical lateral zones and which is the most rigid part of the suspended main body, leaving a space beneath which is occupied by the head of the passenger.

Although the external surface of the suspended main body is slightly soft and non-traumatic, it can contain inside itself a metallic structure which increases the resistance of the device and which acts as an element permitting a molding, preferably of the frontal restraint element, thereby improving its adaptation to the contour of the forehead and, in general, to the head.

Figure 2A:
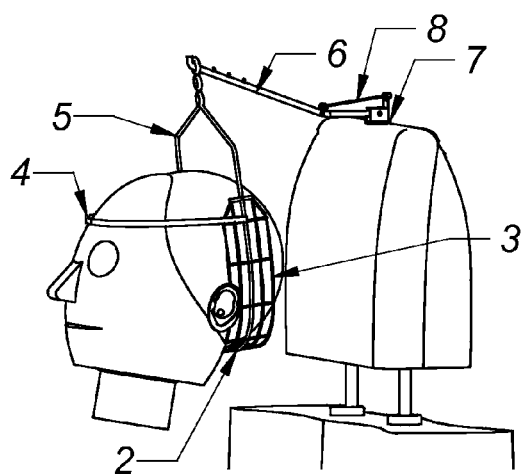
FIG. 2A is a perspective view of the preferred embodiment when the securing element is integrated into the actual vehicle.
Figure 2B:
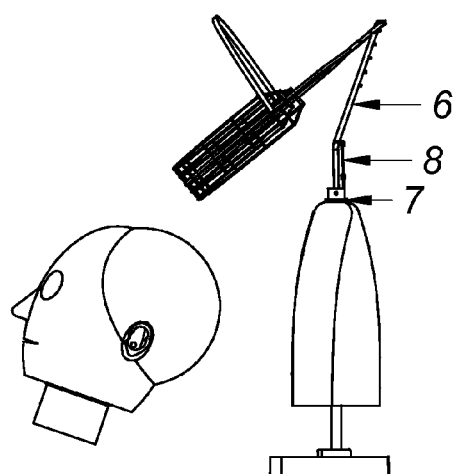
FIG. 2B is a lateral view showing the safety displacement upwards made by the device when the head is not supported on it.

FIG. 2A shows that the hanging main body is suspended from a single rigid suspension element (6) which, in the form of a support bar, extends to a zone of the space located above the head of the seated passenger. The suspension element presents a design which fits with the securing element (7) located in the upper zone of the seat. FIG. 2B shows that, in order to increase the safety of the device, the suspension element can incorporate a spring or tensioner (8) which causes the support bar to be displaced upwards whenever the head of the passenger is not resting in the suspended main body.

FIGS. 3A and 3B show the zone of the space where the main body of the invention hangs. In the side-on view this zone is at a maximum distance (D) of up to 50 cm from the vertical projection of the front edge of the back-rest of the seat, and in the front-on view it is located in a way that is centered with respect to the seat and, therefore, with respect to the passenger's head. The main body of the invention is usually located hanging from the distal part of the suspension element (6). In the front-on view, the functioning axis (A-A') coincides with that of the neck (B-B') while in the side-on view the two are located close together in order to guarantee a better integral rotation of the head with the suspended device when the invention is used.

FIG. 4 shows that the securing element (7) is located in the upper and central part of the back-rest or of the headrest. This concerns an element fixed to the metallic structure of the seat and which comprises an opening in its upper zone, preferably square, rectangular or round in shape, which is where the distal end (9) of the suspension element is housed by means of a vertical coupling that can be released permitting said element to become detached from the seat, as a safety measure, due to the simple effect of gravity in the event of the vehicle toppling over, constituting what has been known as the "anti-topple safety design". In order to modify its length, the suspension element can comprise a telescopic extension mechanism (10) in its intermediate zone.

DESCRIPTION OF THE PREFERRED EMBODIMENTS FOR VEHICLES IN WHICH THE SECURING ELEMENT IS NOT PREVIOUSLY INTEGRATED INTO THE PASSENGER SEAT

This type of vehicle can be any of those currently used for passenger transport.

First Embodiment

In FIG. 5A, an embodiment that includes the entire securing system of the invention can be seen. This system comprises a rigid element (11) which is fixed in the vertical bars (12) of the vehicle headrest, and which in this embodiment has the form of an "H" so that it adapts better to the majority of headrests existing in automobiles. The securing is completed by means of screws or other similar elements (13). A support bar (14) is fixed in the securing element (11), generally via its rear part, in order to then follow an ascending path behind the headrest until reaching its upper edge (15). From this place, it will be directed by means of a suspension element (6), fixed or removable, towards the zone of the space, which has already been described in this document, located above the passenger's head.

Second Embodiment

Represented in FIG. 5B is a suspension element (6), with a removable securing system which is fastened on the upper or rear surface of the actual back-rest or of the headrest of the vehicle and which can be adapted to any type of seat. It is based on the use of one or several cords, belts or similar elements (16), which are located in the horizontal or vertical direction and which directly secure the suspension element to the upper zone of the vehicle seat or to its headrest. Generally, this embodiment also comprises a securing plate (17) in order to improve its stability.

DESCRIPTION OF THE PREFERRED EMBODIMENT FOR VEHICLES IN WHICH BOTH THE SECURING SYSTEM AND THE SUSPENSION ELEMENT ARE INTEGRATED INTO THE PASSENGER SEAT

In this embodiment, a suspension bar (18) is integrated into the structure of the back-rest and remains hidden inside it when is not been used. When the invention is going to be used, the bar is manually pulled upwards. The cross-section represented in FIG. 6 shows that, once outside of the seat and without is becoming detached from it, the bar (18) is inclined forwards by means of a mechanism articulated in its base. The main body of the headrest is then hung. This bar can comprise an automatic withdrawal system, which acts when the head ceases to rest in the device by means of a spring, counter-weight or similar element (19), located inside an internal cavity (20) of the seat, which is where said suspension bar is stored when it is not being used.

The invention claimed is:

1. A suspended vertical head restraint for use with a vehicle seat of a vehicle to restrain a passenger head of a passenger, the suspended vertical head restraint comprising a removable main body (MB) and a single rigid suspension element (6), wherein:
   a) said removable main body (MB), is hung from said single suspension element and without a direct contact with the vehicle seat solely with said suspension element by means of a contact zone in which the main body is articulated, has mobility in all directions and has a construction that is light, flexible, resistant to traction and with a soft surface, with a design that allows for adaptation, according to the height, of different passengers; said main body (MB) comprising five zones including an upper zone, which serves for hanging said main body from the suspension element, a lower zone, which serves for supporting the passenger head via a lower occipital part of the passenger head and restricting displacement of the passenger head downward and backward, two vertical lateral zones which serve for restricting the sideways movements of the passenger head, a forward zone, which is adjustable and can be removed, and which serves for surrounding a frontal zone of the passenger head, for restricting forward displacement of the passenger head and having a controlled breakage point, and a bridge, which is the most rigid part of the suspended main body and which leaves a space underneath where the passenger head is located, a functioning axis (A-A') of the removable main body having a component that is mainly vertical in order to allow rotation of the neck with the suspended vertical head restraint during use and having a slight inclination forward, said functioning axis passing mostly behind ears of the passenger head;
   b) said single rigid suspension element, in the form of a support bar, is detachable from the vehicle seat, has a first end secured in an upper zone of a back-rest or of a headrest of the vehicle seat, and a second end which is located forwardly of the first end to be above the head of the passenger when seated and at a maximum distance (D) of up to 50 cm from vertical projection of front edge of the back-rest of the vehicle seat, and in front-on view is located so as to be centered with respect to the vehicle seat and with respect to the passenger head, the main body being able to hang from any zone of the suspension element.

2. The suspended vertical head restraint of claim 1, wherein the lower zone of the suspended main body (MB) has the form of a net or comprises an array of holes in order to reduce as far as possible the contact area between the suspended main body and the passenger head of the passenger.

3. The suspended vertical head restraint of claim 1, wherein parts of the suspended main body (MB) contain an internal metallic structure which has been over-molded or lined with a soft surface polymer, of an elastomer or silicone.

4. The suspended vertical head restraint of claim 1, wherein the suspension element is removable and, at an end thereof closest to the vehicle seat, comprises a section that fits with a securing element fixed to the metallic structure of the vehicle seat and located in a highest zone (7) of the vehicle seat, via an opening located in an upper part thereof.

5. The suspended vertical head restraint of claim 4, wherein the zone of attachment of the end closest to the vehicle seat of the suspension element with the securing element of the seat has an anti-topple safety design by which the suspension element becomes detached from the seat due to the simple effect of gravity in the event of the vehicle toppling over.

6. The suspended vertical head restraint of claim 1, wherein the suspension element is a metal bar which has a telescopic element for adjusting a length of said metal bar.

7. The suspended vertical head restraint of claim 1, wherein the headrest is an individualized headrest on the back-rest with vertical metal bars, both the suspension element and the securing element are removable, and a securing element is fixed to the vertical metal bars of the headrest.

8. The suspended vertical head restraint of claim 1, wherein the suspension element is secured at an upper part of the vehicle seat by one or several adjustable cords or belts, in such a way that the suspension element is easily removable, said suspension element generally being supported on an upper part of the seat in order thereby to have greater stability and greater resistance and said suspension element being able to be coupled to a securing plate for this same purpose.

9. The suspended vertical head restraint of claim 1, wherein both the suspension element and a securing element are integrated into a free space located inside of the back-rest and in which is housed the suspension element which can be extracted by manual vertical pulling so that the suspension element is finally located forwards by a mechanism articulated on a base thereof, and which contains a counterweight or a spring which exerts traction downwards on the suspension element in order to facilitate an automatic withdrawal of the same when the suspended vertical head restraint is not being used.

10. The suspended vertical head restraint of claim 1, wherein said suspension element comprises a safety mechanism which causes the support bar to be displaced upwards as a safety measure when the passenger head is not resting in the suspended main body (MB).

11. The suspended vertical head restraint of claim 10, wherein the safety mechanism of the suspension element comprises a spring or a tensioner.

* * * * *